United States Patent [19]

Groene

[11] 4,247,145
[45] Jan. 27, 1981

[54] CARGO UNIT WITH SUPPORT JACK ASSEMBLIES

[76] Inventor: Richard L. Groene, 1800 Fuller Rd., West Des Moines, Iowa 50265

[21] Appl. No.: 59,577

[22] Filed: Jul. 23, 1979

[51] Int. Cl.$^3$ .............................................. B60P 3/32
[52] U.S. Cl. ..................................... 296/164; 296/167
[58] Field of Search ................... 296/156, 164, 167; 254/45; 414/498

[56] References Cited

U.S. PATENT DOCUMENTS

| | | | |
|---|---|---|---|
| 3,164,275 | 1/1965 | Schatzl | 414/498 |
| 3,532,236 | 1/1969 | Hostetler | 296/164 |
| 4,044,999 | 8/1977 | Dodgen | 254/45 |

Primary Examiner—John J. Love
Assistant Examiner—John A. Carroll
Attorney, Agent, or Firm—Rudolph L. Lowell; G. Brian Pingel

[57] ABSTRACT

A vehicle mounted cargo unit having a pair of rear jack assemblies employed to tie the cargo unit to a bed of the vehicle on which it is mounted and to aid in the support of the cargo unit when removed from the vehicle. The cargo unit has a generally rectangular box shape enclosure with a pair of side walls and a bottom wall of a generally U-shape in transverse cross section. Included in the bottom wall are a base section and a pair of upright side sections, each of which has an upper outwardly projected lateral section secured at an outer end to an adjacent side wall to form a channel portion for receiving a side portion of the vehicle bed. The jack assemblies are mounted in an upright position in the rear of the channel portions such that they are extendible to support the rear of the cargo unit and are retractible into engagement with the vehicle to secure the cargo unit thereon for transport.

3 Claims, 3 Drawing Figures

CARGO UNIT WITH SUPPORT JACK ASSEMBLIES

FIELD OF THE INVENTION

The present invention relates in general to cargo units that are mountable upon a vehicle for transport and have extendible and retractable jack assemblies for supporting the cargo unit when removed from the vehicle.

DESCRIPTION OF THE PRIOR ART

A wide variety of vehicle mounted camper units and cargo units are known in the art. It is relatively commonplace for such units to have front and/or rear jack assemblies which in transport remain exposed for coaction with a portion of the vehicle for tie-down purposes. Such systems are shown, for example, in U.S. Pat. Nos. 3,532,236, 3,580,599, 3,415,490, 3,698,758 and 4,044,999. The exposed jacks, in vehicle travel, detract from the overall appearance of the vehicle unit mounted assembly; are subject to being damaged and frequently cause personal injury by being inadvertently walked into or bumped against.

SUMMARY OF THE INVENTION

The present invention provides a cargo unit mountable on a bed of a truck vehicle. The cargo unit has a pair of linearly extendible and retractible rear jack assemblies which when retracted are substantially disposed within the cargo unit and when extended are engageable with the ground to support the cargo unit when removed from a vehicle. Coacting means are included on a rear bumper of the vehicle and each of the jack assemblies and are engageable upon retraction of the jack assemblies to secure the rear portion of the cargo unit to the vehicle.

DESCRIPTION OF THE PREFERRED EMBODIMENT

Figures 1, 2, 3:
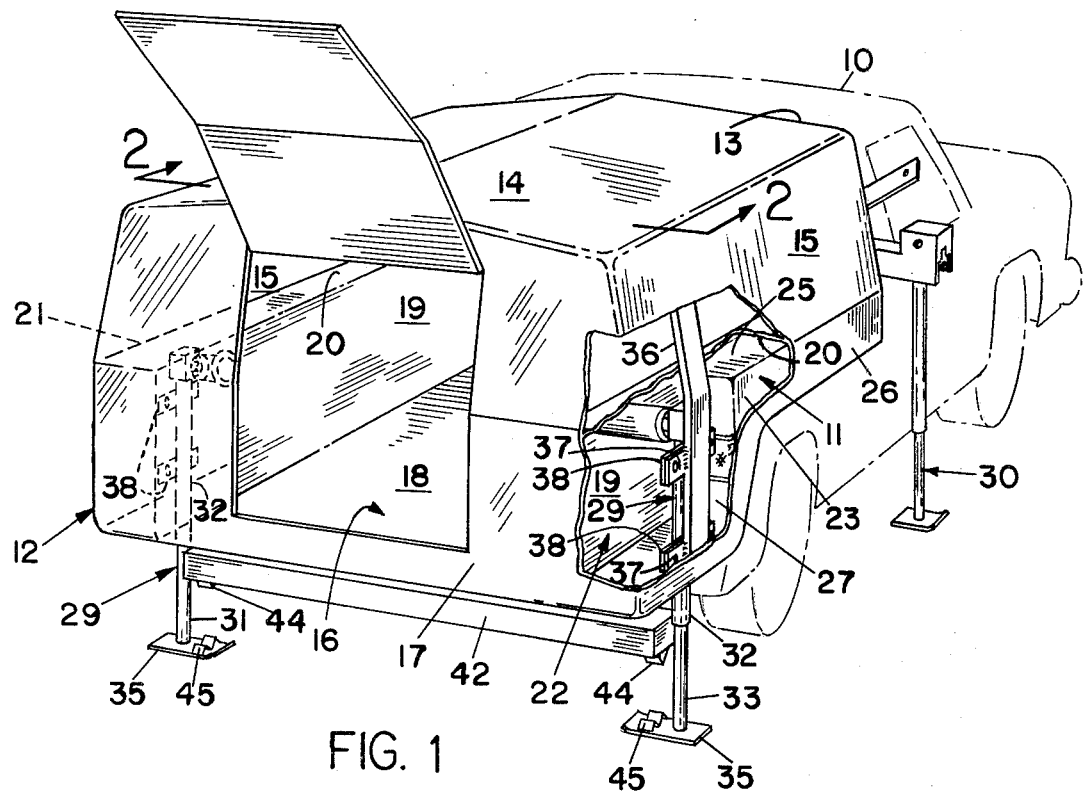
FIG. 1 is a rear side perspective view of a truck and a preferred embodiment of the cargo unit of the present invention with the rear jack assemblies and front jack assembly thereof illustrated in extended ground engaging positions and with portions of the cargo unit cut away to show interior construction.
FIG. 2 is an enlarged sectional view taken on the line 2—2 in FIG. 1 but showing the rear jack assemblies and front jack assemblies in retracted positions therefor.
FIG. 3 is a fragmentary sectional view taken on the line 3—3 in FIG. 2.

With reference to the drawings, a vehicle 10 of a type commonly referred to as a pickup truck is shown in FIG. 1 and has a bed 11 adapted to receive a cargo unit 12 of the present invention. The cargo unit 12 is of an integral lightweight fiberglass construction and is removably mounted on the bed 11 of the truck 10. Accordingly, the cargo unit 12 can be readily removed from the truck 10 in a supported position on jack assemblies.

The cargo unit 12 (FIGS. 1 and 2) has a generally rectangular box shape including a front wall 13, a top wall 14, a pair of laterally spaced opposite side walls 15, a bottom wall 16 and a rear wall 17. The bottom wall 16 is of a generally U-shape in transverse cross section having a base section 18 and a pair of spaced upright side sections 19 relatively formed for reception in a nested relation with the truck bed 11.

The upper end of each side section 19 terminates in an outwardly projected lateral section 20 having an outer edge 21 that is joined to a longitudinal center portion of a corresponding cargo unit sidewall 15. Thus, the side sections 19 with their lateral sections 20 and the sidewalls 15 form channel portions 22 extending the entire length of each side of the cargo unit 12.

When the cargo unit 12 is mounted on the truck 10 within the truck bed 11, opposite double walled side portions 23 of the bed 11 are received in the channel portions 22, with the lateral sections 20 positioned adjacent to and in an overlying relation with top surfaces 25 of the side portions 23. Accordingly, lower portions 26 of the sidewalls 15 and the side sections 19 of the bottom wall 16 are arranged in a straddling relation with the truck bed side portions 23.

As shown in FIG. 1, each of the side portions 23 of the truck bed 11 terminate in a rear end portion 27 spaced from the cargo unit rear wall 17 to provide storage areas for a pair of rear jack assemblies 29 that support the rear of the cargo unit 12 off the ground when removed from the truck 10. The cargo unit 12 also has a pair of front jack assemblies 30 for supporting the front of the unit 12. One of the assemblies 30 is shown in FIG. 1 in an extended ground engaging or operating position. For transport purposes the front assemblies 30 are contracted and manipulated for reception within a storage chamber 31 (FIG. 2) to a position within the transverse confines of the cargo unit 12 as described in detail in my copending application Ser. No. 58,482, filed on July 18, 1979, now Pat. No. 4,239,430 and entirely incorporated by reference herein.

Each of the rear jack assemblies 29 is of generally standard construction and includes a cylindrical body member 32 arranged in a telescoping relation with a linearly extendible and retractable screw member 33. Retraction and extension of the screw member 33 is accomplished in a usual manner by a turn screw 34 (FIG. 2) which is manually actuable by a detachable hand crank (not shown). Mounted on the bottom end of each screw member 33 is a flat horizontal support foot 35 to provide a relatively large ground engaging surface area.

To secure each jack assembly 29 in a channel portion 22, a U-shaped metal reenforcing beam 36 is secured transversely across the interior of the top wall 14 and down the side walls 15 to extend into the rear interior of the channel portions 22. A pair of vertically spaced mounting plates 37 are fixed to each of the bottom end portions of the beam 36. Correspondingly vertically spaced mounting plates 38, welded to the jack assembly body members 32, are bolted to the mounting plates 37 to securely fasten a jack assembly 29 in an upright position to the beam 36.

Thus, the jack assemblies 29 are bolted to the rear side portions of the cargo unit 12 so that they are in proper position for supporting the rear side portions of the unit 12 upon extension of the screw members 33. To facilitate extension or retraction of a screw member 33 from within the cargo unit 12, each of the base section side sections 19 has a rear upper aperture 40 (FIG. 2) that is in substantial axial alignment with the head of the turn screw 34 to provide access thereto for a handcrank for turning the screw 34. Preferably, a sleeve member 41 is fitted into each of the apertures 40 to extend between an aperture 40 and a turn screw 34 for guiding the handcrank into engagement with the turn screw 34.

A rear bumper 42 of the truck 10 is mounted from the truck frame by braces 43 (FIG. 3), and is spaced behind the truck bed 11 to lie beneath the rear end of the cargo unit 12 substantially in line with and between the jack assemblies 29. Fixed on the bottom end surfaces of the bumper 42 are V-shaped members 44 that are engageable with M-shaped members 45 (FIG. 1) on the top of the jack assembly support feet 35 when the jack assemblies 29 are in a fully retracted condition, as shown in FIG. 2. As a result, when the jack assemblies 29 are fully retracted, the support feet 35 bear against the bumper 42 via the engagement members 44 and 45 to securely tie-down the rear portion of the cargo unit to the truck 10 during transport of the cargo unit 12 thereon. The front of the cargo unit is held on the truck for transport by a latch assembly 47 (FIG. 2) that is engagable with a catch member 48 fastened to the floor of the truck bed 11 to protrude through the cargo unit bottom wall 16 as described in detail in my above mentioned copending application.

Thus, the present invention provides a truck mountable cargo unit with extendible and retractable jack assemblies that are substantially enclosed within the interior of the cargo unit when retracted to prevent being damaged, but yet are readily extendible into ground engaging positions to support the cargo unit when removed from a truck.

Although the invention has been described with respect to a preferred embodiment thereof, it is to be understood that it is not to be so limited since changes and modifications can be made therein which are within the full intended scope of this invention as defined by the appended claims.

I claim:

1. A cargo unit mountable on a vehicle having a body unit with upright opposite side portions comprising:
   (a) a generally rectangular box shape enclosure having:
      (1) a pair of laterally spaced opposite side walls,
      (2) a bottom wall of a generally U-shape in transverse cross section, including:
         (a) a base section, and
         (b) a pair of upright side sections spaced inwardly of said side walls, each of which has an upper outwardly projected lateral section with a terminal end secured to an adjacent side wall at a position above the lower edge thereof so that each side section, lateral section and adjacent side wall together form a downwardly facing channel shaped portion for receiving a side portion of said vehicle body unit,
   (b) a pair of linearly extendible and retractible rear jack assemblies spaced transversely of said enclosure, each of which has a body member and a lift member arranged in telescoping relation and means for extending and retracting said lift member relative to said body member,
   (c) means for securing each body member of a jack assembly in an upright position on an adjacent one of said side walls and within a channel shaped portion for downward extension of the lift members of said jack assemblies into ground engagement to support the rear end portion of said cargo unit and for retraction within said body member for transport of said cargo unit on said vehicle, and
   (d) means on said enclosure for actuating said extending and retracting means to selectively extend or retract said lift members.

2. A cargo unit according to claim 1 wherein:
   (a) each of said lift members has a lower end with a ground engaging support foot secured thereon,
   (b) said vehicle has a rear bumper spaced rearwardly from the rear end of said body unit and extended between said jack assemblies with the ends thereof adjacent said jack assemblies, and
   (c) coacting means on each support foot and on said rear bumper engageable upon retraction of said lift members to secure the rear end portion of said enclosure on said vehicle body unit.

3. A cargo unit according to claim 1 wherein:
   (a) said upright side sections have access means to provide for the actuation of said extending and retracting means only from within said enclosure.

* * * * *